F. Burke,
Hackling Machine,
Nº 17,420.    Patented June 2, 1857.
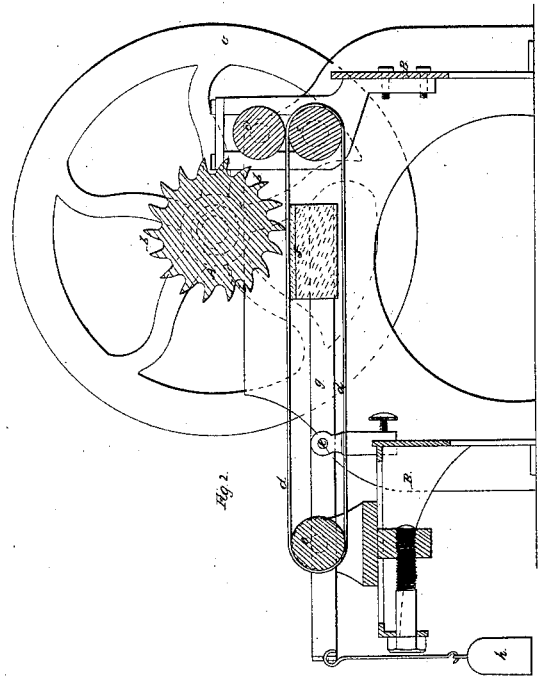
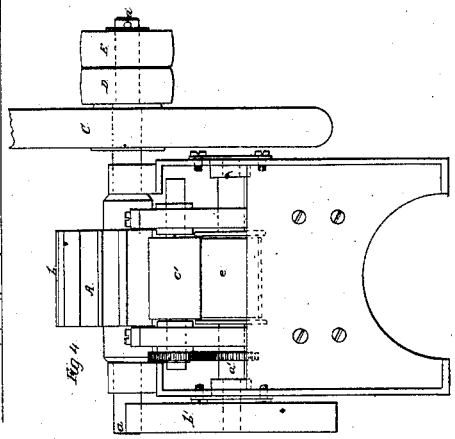
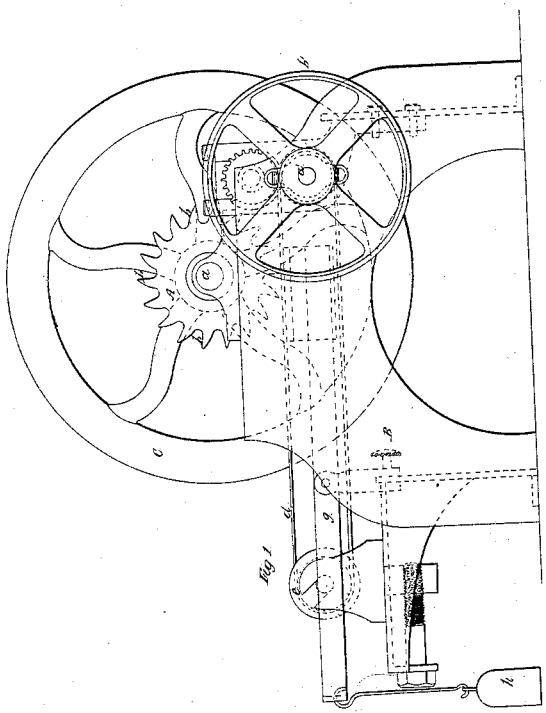
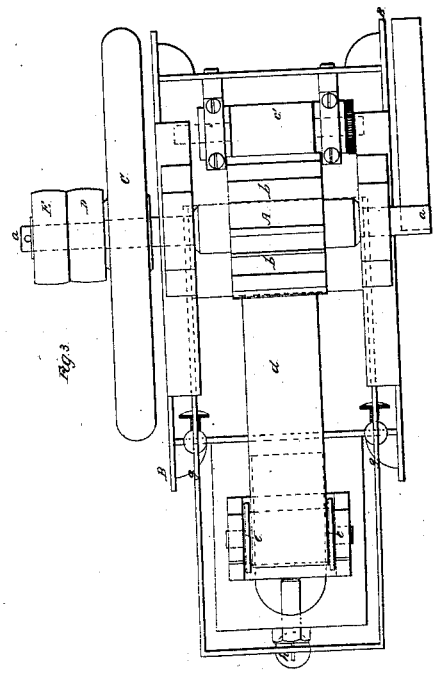

UNITED STATES PATENT OFFICE.

FRANCIS BURKE, OF BRITISH WEST INDIES.

IMPROVEMENT IN MACHINERY FOR PREPARING THE FIBERS OF BANANAS, PLANTAINS, ALOES, &c.

Specification forming part of Letters Patent No. 17,420, dated June 2, 1857.

*To all whom it may concern:*

Be it known that I, FRANCIS BURKE, of Woodlands Montserrat, British West Indies, at present residing in London, gentleman, a subject of the Queen of Great Britain, have invented or discovered a new and useful Improvement in Obtaining or Preparing the Fibers of Plantains, Bananas, Aloes, and other Vegetables for Various Manufacturing Purposes; and I, the said FRANCIS BURKE, do hereby declare the nature of the said invention and in what manner the same is to be performed, to be particularly described and ascertained in and by the following statement thereof—that is to say:

My said invention of an improvement in obtaining or preparing the fibers of the plantain, banana, aloe, and other vegetables for various manufacturing purposes consists in a peculiar apparatus or machine by which the vegetables or vegetable substances are submitted to the action of beaters or projections fixed upon the periphery of a revolving drum, roller, or cylinder, so that the fibers may be separated from the other vegetable matters with which they may be combined or mixed. An apparatus for this purpose constructed according to my invention may be furnished with one or several cylinders or rollers having such beaters or projections as aforesaid fixed upon the periphery of each cylinder or roller. The beaters or projections may be made of metal, wood, or other convenient material, and they may be made in the form of bars or of any other convenient form, projecting to a sufficient distance from the surface of the cylinder or roller upon which they may be placed, to cause them to act efficiently as beaters, scrapers, or bruisers upon the vegetable matters to be operated upon. The beaters or projections upon a cylinder or roller may all be of the same shape and size, or may be made of different shapes and sizes, so as to produce a varied action upon the vegetable matters. The stalks, stems, or leaves of the plants or other vegetable matters to be operated upon are supported or upheld upon a platform, traveling apron, or other convenient surface or support while being subjected to the action of the beaters or projections, so that the material may be allowed to travel slowly under or past the cylinder or cylinders and be subjected to the action of the beaters or projections until the required effect shall have been produced. The platform or apron upon which the vegetable matters are placed I cover with leather or other suitable material, or make it in such a manner as to be somewhat yielding, in order to prevent the vegetable fibers being injured, and the fibers may be subjected to any ordinary processes for preparing them to be made into textile fabrics, or to be applied to any other manufacturing purposes to which they may be applicable.

The apparatus may be used for operating upon vegetable matters in the fresh or green state, or after being wetted or subjected to any process for facilitating the separation of the fibers.

Having thus stated the nature of my said invention, I will proceed more fully to describe the manner of performing the same, reference being also had to the drawings hereunto annexed, and to the letters, figures, and description marked therein.

The form of the machine used may be varied in its detail, but in substance the action will in all cases be the same.

The vegetable matters above mentioned are by preference to be treated when in the green and undried state, and the most simple form of machine, when the fibrous matters are not to be held by hand during the beating process but fed continuously to the machine, is as follows: A fluted roller, A, of cast-iron, (about ten inches diameter and about two feet six inches long,) is the size I prefer; but the size may be varied, and, in place of being fluted, ribs or projections may be formed or applied on a cylinder or roller and by preference parallel with the axis. The outer edges of the flutes, ribs, or projections are to be formed smooth and blunt, like the back of a table-knife, so as to bruise and to some extent scrape or force the green pulpy matter from the fibers without cutting. This roller or cylinder I prefer to rotate at the rate of one thousand to one thousand five hundred revolutions in a minute; but this may be varied. Below this roller is an endless apron, *d*, with a slow surface-speed. What I have used is a speed of about one-fourteenth of that of the surface of the roller or cylinder above described. This apron I prefer to be of strong leather, onto which the vegetable matters are placed longitudinally in a thin layer, and the same is pressed down onto the apron by a small pressing-roller, $c'$, and in this manner the vegetable substance is presented to the action of the beating cylinder or roller, and is beaten by the edges of the flutes or projections, and in order to give effect to such beating there is a movable or yielding bed or platform, $f$, arranged under the apron, as shown in the drawings and just where the beating takes place, and I prefer that it should be coated with vulcanized india-rubber, to give elasticity thereto. This bed or platform is upheld by a spring, or it may be by a lever, $g$, and weight $h$. By this arrangement the vegetable fibrous matters above mentioned are moved slowly through the machine, while the beating of the projecting ridges of the cylinder is in very quick succession; and to aid the process of separating the green vegetable matters from the fibers I have found it advantageous to have a continuous stream or dropping of water onto the vegetable matter as the same comes under the beating action. If, in passing the vegetable matters once under the action of the machine, they be found not to have been sufficiently cleaned or separated, the matters are to be again acted on thereby; or in place of having only one beating cylinder or roller and its yielding bed or platforms, there may be two or more of such in succession acting with the same apron, so that the vegetable matter having passed under the action of the first beating cylinder or roller, it would be again acted on by another, and then another.

The operative parts or machinery above described are to be supported by a suitable frame, B. The main shaft may carry a fly-wheel, C, and a fast pulley, D, and a loose pulley, E, the belt by which motion is to be communicated to the beater A being made to run on the one or the other of such pulleys, as occasion may require.

The machine is represented in side elevation in Fig. 1, in longitudinal section in Fig. 2, in top view in Fig. 3, and in end elevation in Fig. 4.

When the machine is in operation, the vegetable material is fed into it between the rollers $c$ $c'$ and on the apron $d$. The apron $d$ is fixed on a shaft, $a'$, which carries a pulley, $b'$, around which a belt may pass, so as to impart motion to the apron.

By means of the yielding bed and apron combined with the beating-cylinder the vegetable material will be operated on or beaten without being thrown forward off the apron by the beaters, as the bed will not only hold the material up to the beaters with sufficient pressure to enable them to crush it, but will give way, so as to prevent its adhesion to the apron from being disturbed to an extent sufficient to cause the material to be thrown off the apron by the beaters.

The vegetable matters above mentioned, having been beaten and acted on as above described, are then to be well washed with water and dried, when they will be in a condition to be used for manufacturing purposes by ordinary processes.

I do not claim any of the parts separately; but

What I claim is—

The combination of the beating-cylinder with the endless apron and yielding table or surface under the apron, substantially as above explained.

FRANCIS BURKE.

Witnesses:
 WM. SIMPSON,
  *Notary Public.*
 R. HUMPHRYS.